Nov. 26, 1935.　　　R. D. CLEAVINGER　　　2,022,339
GRAIN HEADER
Filed Aug. 20, 1934　　　4 Sheets-Sheet 2
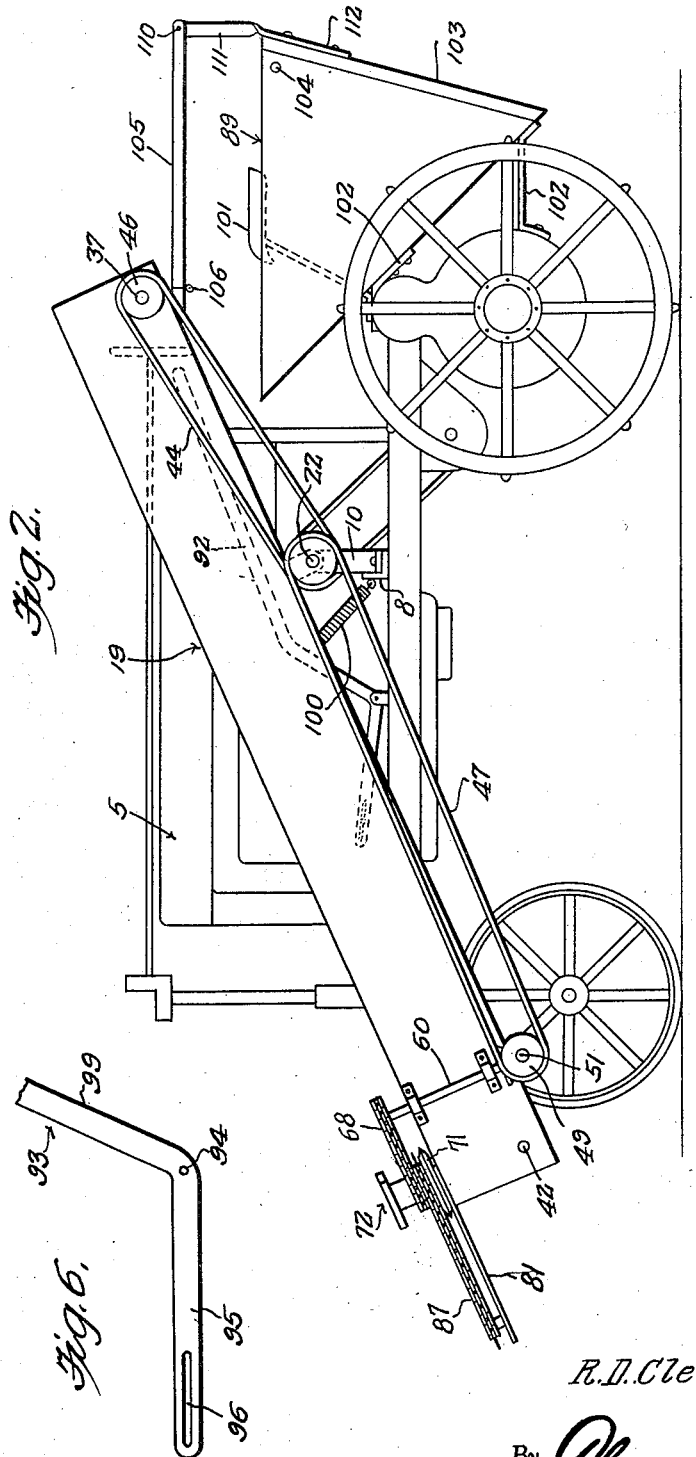
Inventor
R. D. Cleavinger,
By Clarence A. O'Brien
Attorney

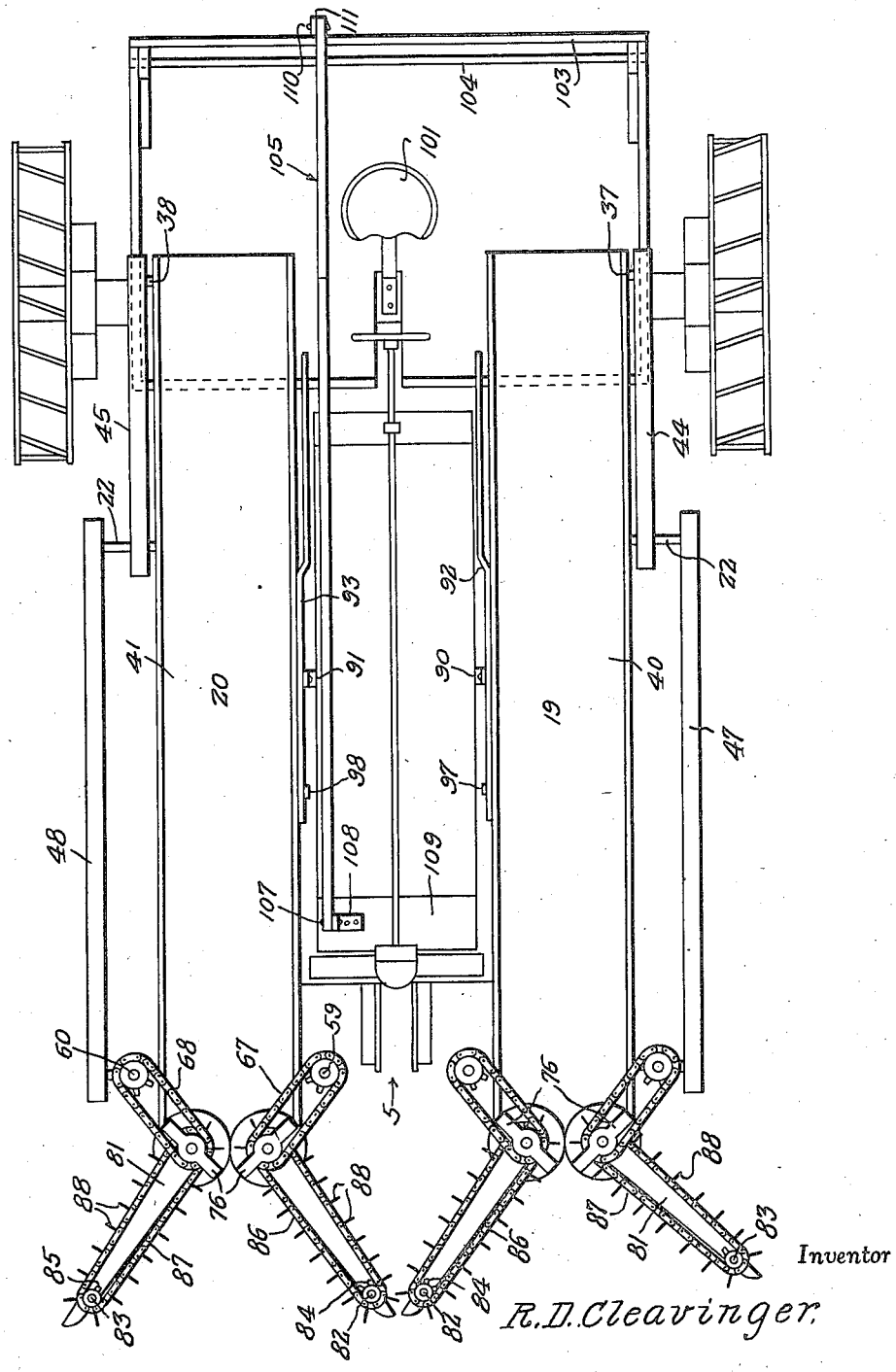

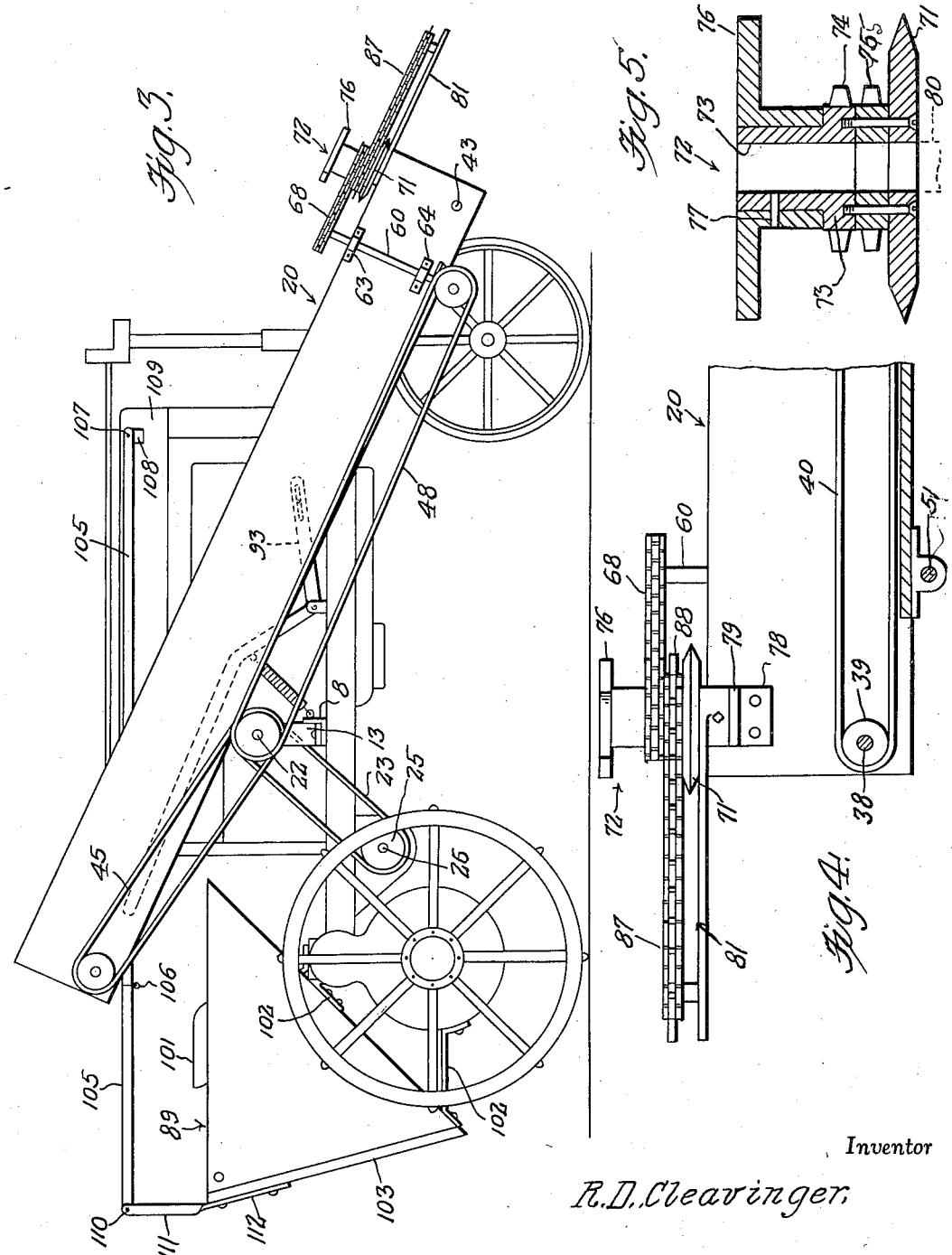

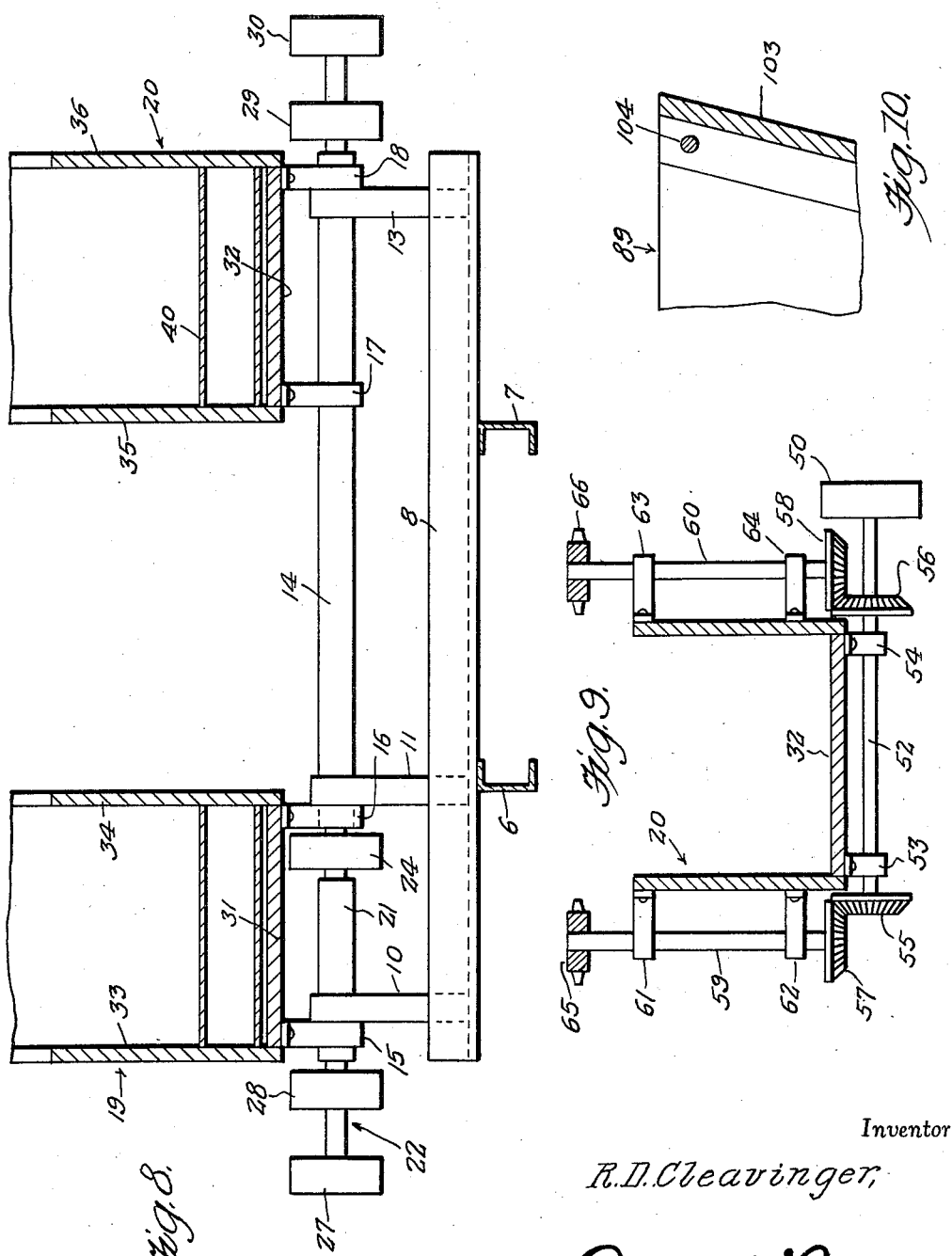

Patented Nov. 26, 1935

2,022,339

UNITED STATES PATENT OFFICE 2,022,339

GRAIN HEADER

Rhoades D. Cleavinger, Dalhart, Tex.

Application August 20, 1934, Serial No. 740,708

4 Claims. (Cl. 56—15)

My invention relates generally to grain handling machines for use in the field, and particularly to a tractor drawn and operated machine for heading and gathering the heads of such grains as maize, kaffir corn, and similar grains, and an important object of my invention is to provide a grain header of the character indicated which efficiently heads the grain under all conditions, eliminating the present difficulty and expense of performing this operation.

Another important object of my invention is to provide a grain header of the character indicated above which can be arranged to travel between two adjacent rows of standing grain and head the rows, the heading taking place as fast as the tractor can be driven, the work of heading being efficiently done by the machine whether the heads of the grain are in a frozen condition or not; and which is capable of heading thirty to forty acres of grain in a single day at a cost not exceeding five cents per acre for fuel for the tractor.

Another important object of my invention is to provide a grain heading machine of the character indicated which can be constructed in the form of an attachment for a tractor or manufactured as a unit comprising the tractor.

Other objects and advantages of my invention will be apparent from a reading of the following description in connection with the drawings, wherein for purposes of illustration I have shown a preferred embodiment of my invention.

In the drawings:—

Figure 1 is a top plan view of a grain header machine in accordance with the invention.

Figure 2 is an elevational view of the left hand side of the machine.

Figure 3 is an elevational view of the right hand side of the machine.

Figure 4 is a vertical longitudinal sectional view taken through the forward end of one of the elevators showing the gathering mechanism.

Figure 5 is a vertical transverse sectional view through the gathering mechanism double sprocket.

Figure 6 is an elevational view of a portion of the elevator raising and lowering lever.

Figure 7 is an elevational view of a rest.

Figure 8 is a transverse vertical sectional view taken through both of the elevators through Figure 2 at a point to the rear of the pivotal support of the elevators.

Figure 9 is a transverse vertical sectional view taken through the forward part of the right hand elevator at a point to the rear of the gathering mechanism thereof.

Figure 10 is a vertical longitudinal sectional view through the receiving hopper showing the pivoted door.

Referring in detail to the drawings, the numeral 5 generally designates a conventional tractor, such as a Farmall tractor or other suitable tractor, having the side rails 6, 7 on and across which is mounted the L-shaped beam 8 upon the horizontal flange of which are mounted and secured the vertical standards 10, 11, 13, respectively, in the upper ends of which is journaled the tubular axle 14 which is also journaled in depending brackets 15, 16 secured to the bottom of the elevator 19, and 17, 18, secured to the bottom of the elevator 20. These brackets are located respectively at the laterally outward side of the standards as clearly shown in Figure 8. Rotatable in the tubular axle 14 is the rotatable shaft 22, which also rotates in the extension 21 of the tube 14 which is under the elevator 19. The shaft 22 is driven by a belt 23 trained over the pulley 24 and over the pulley 25 which is fixed on the shaft 26 of the power take-off of the tractor 5. Axially spaced along the respective outer ends of the shaft 22 are the pulleys 27, 28 adjacent the elevator 19, and the pulleys 29, 30 adjacent the elevator 20. It will be noted that the elevators can be tilted so as to raise or depress their forward ends, by virtue of the hinge mounting provided by the described brackets and standards in conjunction with the tubular axle and the shaft 22.

The elevators are similar in construction. Each has a bottom plate 31, 32, respectively, to which the respective depending brackets are secured as shown in Figure 8, and rising from the edges of the bottom are the respective side members 33, 34 and 35, 36, respectively, through which are journaled at the upper or rear ends of the elevators the respective shafts 37, 38 on which are fixed the rollers 39 over which is trained a conveyor belt 40, 41 respectively, the lower end of which is trained over similar rollers mounted on shafts 42, 43 which are rotatably supported across the respective sides of the elevators. The respective conveyor belts are driven by belts 44, 45, respectively, each trained over the pulleys 46, 47 on the shafts 37, 38 and over the pulleys 28 and 29 on the power shaft 22 of the tractor. Belts 47, 48 respectively, are trained over the outer pulleys 27, 30 on the power shaft 22 and over the pulleys 49, 50 on the respective shafts 51, 52 of the gathering mechanisms.

Since the gathering mechanism of each elevator is the same in construction, a description of one will suffice as the description for the other.

Referring to Figure 9, it will appear that the shaft 52 is journaled in depending brackets 53, 54 secured to the bottom 32 of the elevator 20. The shaft 52 having outwardly of the sides of the elevator the oppositely beveled gears 55, 56 which are in mesh with the respective beveled gears 57, 58 fixed on the lower end of the vertical shafts 59, 60 which are journaled in the vertically spaced brackets 61, 62 fixed on the right hand side of the elevator and the brackets 63, 64 fixed on the left hand side of the elevator.

Fixed to the upper end of each vertical shaft 59, 60 is a respective sprocket 65, 66 over which are trained sprocket chains 67, 68 which are also trained over superposed sprocket wheels 74, 75 of the sprocket assemblies 72, illustrated in detail in Figure 5.

Each sprocket assembly 72 comprises the tubular part 73 which has integrally formed therein the upper sprocket 74 and the upper reduced portion 73' on which is pinned as indicated at 77 the member carrying the gathering lugs 76. Attached to and below the upper sprocket 74 is the lower sprocket 75 and below this the circular disk knife 71, the sprocket 75 and the knife 71 being secured to the bottom of the member 73 by bolts or other fastening means, a shaft 80 passing upwardly through the described members and through the gathering board 81 which is below the disk knife 71.

A bracket 78 secured to the inner side of each side wall of the elevator at the lower end thereof has the shaft 80 mounted thereon as indicated in Figure 7 carrying the gathering mechanism described.

The outer end of the gathering board 81 has a stub-shaft carrying a sprocket 83 over which is trained the gathering fingering equipped chain 87 which is trained also over the sprocket 75 on the assembly 72, the gathering fingers being designated 88. The fingers 88 catch onto the stalks of the grain and assist in pulling the stalks rearwardly between the gathering boards and into engagement with the disk knives 71 which then cut off the heads in such a way that the heads fall onto the conveyor belt in the respective elevator and are conveyed by the belt rearwardly along the elevator and dumped over the rear end of the elevator into the receiving hopper generally designated 89, which is located under the rear ends of the elevators as shown in Figures 1 and 2, and 3.

On opposite sides of the tractor are mounted L-shaped brackets 90, 91, respectively, on which are pivoted the elevator raising and depressing levers 92, 93, respectively which are of the shape shown in Figure 6, being pivoted to the L-shaped brackets at the point indicated by the numeral 94, and having the slot 95 forwardly of the pivotal point and engaged with a pivot 97, 98, respectively, fixed on the inner side of the respective elevators. The portion 99 of the levers on the opposite side of the pivotal point 94 has attached thereto one end of a spring 100 whose opposite end is connected to the cross member 8, so that the tension of the spring will hold the elevators normally in positions in which their forward ends are depressed, the tension of the springs being sufficient to maintain the elevators in the depressed position until elevated by positive operation of the levers 92, 93 when it is desired to raise the gathering mechanism to the height of the heads of the grain being operated upon. The rear ends or handles of the levers 92, 93 are located immediately forwardly of the seat 101 of the tractor so that the tractor operator has easy access thereto and may readily adjust the elevators to the required height in either or both rows as the tractor is moving along and operating upon the grain.

The receiving hopper 89 is generally triangular in side elevation and rectangular in horizontal cross section and is mounted as indicated at 102 over the rear axle of the tractor and extending at opposite sides of the seat thereof and in such a position below the upper ends of the elevators as to receive the grain as it is dropped off the rear ends of the conveyor belts. The rear side of the hopper is provided with a door 103 which is pivoted at its upper end as indicated on a shaft 104 which extends between the sides of the hopper. The door opens by being swung toward the rear from the position in which it is shown in Figure 2, through operating the lever 105 which is located at a position slightly higher than the shoulder-height of the operator. The lever 105 has the joint 106 and is pivoted at its forward end to an L-shaped bracket 108 as indicated at 107, the L-shaped bracket 108 being mounted on the top of the radiator shell 109 or other convenient part of the forward part of the tractor, the rear end of the lever 105 being pivotally connected as indicated at 110 to the upper end of a bracket 111 which is fixed to the rear side of the upper part of the door 103 as indicated at 112. By pushing upwardly on the lever 105 the operator is enabled to swing the door to open position. Suitable means is provided in conjunction with each of the elevator adjusting levers 92, 93 for locking these levers in adjusted position, several conventional arrangements of this character being available for the purpose.

Although I have shown and described herein a preferred embodiment of my invention, it is to be definitely understood that I do not desire to limit the application of the invention thereto, and any change or changes may be made in materials, and in the structure and arrangement of parts, within the spirit of the invention and the scope of the subjoined claims.

What is claimed is:—

1. In combination with a tractor, a beam extending transversely across the tractor, uprights carried by the beam, a conveyor trough supported for rocking movement from the uprights intermediate the ends of the trough, a shaft rotatably supported by the uprights, a take-off shaft extending from one side of the tractor, means for driving the first mentioned shaft from the take-off shaft, a conveyor in the trough, means for operating the conveyor from the first mentioned shaft, manually operated means for adjusting the tilt of the conveyor trough, a pair of upright shafts at the front end of the trough, one at each side thereof, means for rotating the upright shafts from the first mentioned shaft and in opposite directions, disk knives carried by said upright shafts, forwardly diverging gathering fingers carried by said upright shafts, flexible endless members carried by the fingers and having outwardly extending projections thereon, rotary supporting members for each endless member, one of which is arranged at the outer end of the finger, and the other on an upright shaft, and gathering lugs on the upright shafts.

2. In combination with a tractor, a beam extending across the same, uprights carried by the beam, a pair of longitudinally extending conveyor troughs supported for rocking movement from the uprights intermediate the ends of the troughs, manually operated means for adjusting the tilt of each trough, a transverse shaft journalled in the uprights, a transversely arranged take-off shaft, means for driving the first mentioned shaft from the take-off shaft, conveyor means in said troughs, means for actuating the conveyor means from the first mentioned shaft, a pair of rotary members at the front end of each trough and located one at one side of the trough and the other at the opposite side thereof, means for rotating said members in opposite directions from the first mentioned shaft, knives carried by each member and of circular form, gathering lugs carried by each member, a sprocket on each member, a pair of forwardly diverging gathering fingers at the front end of each trough, a sprocket at the front end of each finger, an endless chain passing over said sprocket and the sprocket on the rotary member, outwardly extending projections carried by the chains.

3. In combination with a tractor, a beam extending across the same, uprights carried by the beam, a pair of longitudinally extending conveyor troughs supported for rocking movement from the uprights intermediate the ends of the trough, manually operated means for adjusting the tilt of each trough, a transverse shaft journalled in the uprights, a transversely arranged take-off shaft, means for driving the first mentioned shaft and the take-off shaft, conveyor means in said troughs, means for actuating the conveyor means from the first mentioned shaft, a pair of rotary members at the front end of each trough and located one at one side of the trough and the other at the opposite side thereof, means for rotating said members in opposite directions from the first mentioned shaft, knives carried by each member and of circular form, gathering lugs carried by each member, a sprocket on each member, a pair of forwardly diverging gathering fingers at the front end of each trough, a sprocket at the front end of each finger, an endless chain passing over said sprocket and the sprocket on the rotary member, outwardly extending projections carried by the chains, a substantially V-shaped hopper supported from the rear end of the tractor for receiving material from the two conveyor troughs, a door hinged at its upper end and normally closing the rear of the hopper, an upright connected with the upper end of the door, and a sectional lever having one end pivoted to the upright and its other end to a part of the tractor, the two sections being hingedly connected together for opening movement in an upward direction, whereby upward movement of the two sections will cause the door to swing to open position.

4. In combination with a tractor, a beam extending across the same, uprights carried by the beam, a tubular shaft carried by the uprights, a pair of spaced longitudinally extending troughs, brackets depending from the troughs into which the tubular shaft passes, a shaft passing through the tubular shaft and having its ends projecting beyond the ends of the tubular shaft, means for rotating the shaft from the take-off shaft of the tractor, a conveyor belt in the trough, front and rear rollers in each trough for supporting the conveyor belt, a belt and pulley for driving the rear roller of the conveyor belt from the shaft which passes through the tubular shaft, a pair of upright shafts rotatably supported, a transverse shaft under the front part of each trough, gears connecting the same with the upright shafts of each trough, a pulley on the transverse shaft, pulleys on the shaft which passes through the tubular shaft, belts passing over said pulleys and the pulleys on the transverse shafts, a pair of stationary upright shafts at each side of the front end of each trough, rotary members on each stationary shaft, a chain and sprocket connecting each rotary member with an upright shaft, a disk knife carried by each rotary member, gathering lugs carried by each rotary member, sprockets on each rotary member, forwardly diverging fingers at the front end of each trough, a sprocket at the outer end of each finger, chains passing over said sprocket and the sprockets on the rotary member, outwardly extending projections on said chains and manually operated means for adjusting the tilt of each trough.

RHOADES D. CLEAVINGER.